W. B. Potter,
Check-Rein Slide.
Nº 77,318. Patented Apr. 28, 1868.

Witnesses.
P. T. Dodge.
Edwin Guy.

Inventor:
W. B. Potter
by Dodge & Munn
his attys.

United States Patent Office.

WARREN B. POTTER, OF BOSTON, MASSACHUSETTS.

Letters Patent No. 77,318, dated April 28, 1868.

IMPROVED CHECK-REIN SLIDE.

The Schedule referred to in these Letters Patent and making part of the same.

TO ALL WHOM IT MAY CONCERN:

Be it known that I, WARREN B. POTTER, of Boston, in the county of Suffolk, and State of Massachusetts, have invented certain new and useful Improvements in Check-Rein Slides; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to harness-equipments, and consists in the construction of a novel metallic slide, for check-reins and similar purposes. In the drawings—

The difficulties of keeping the check-rein in position on the hook of the harness-saddle are well known to all horsemen. It is frequently getting loose, and when in position, unless held by some suitable keeper, allows the horse to throw his head from side to side at will. In order to obviate these difficulties, and hold the head of the horse steady, is the object of my invention.

Figure 1:
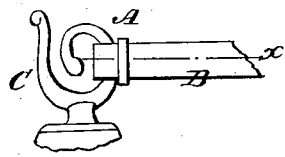
Figure 1 represents my slide in position on a check-rein.
Figure 2:
Figure 2 is a longitudinal section on the line $x\ x$ of fig. 1.
Figure 3:
Figure 3 is a plan view.

I construct my check-rein slide, A, out of any suitable metal for the purpose, and in the form clearly shown in fig. 3. It may be made of any desired size, and oblong, square, or circular, to suit the taste or fancy of the manufacturer. In this slide I make two oblong rectangular openings, $a$, of the same size, sufficiently large to admit the passage of an ordinary check-rein. These openings I make parallel with each other, as clearly shown in fig. 3. Through these openings I pass the check-rein B, as shown in fig. 2, and slide it up close to the hook C, when desired, as shown in fig. 3.

It is obvious that when the harness is of circular instead of flat pieces, the openings in the slide may be made circular to suit it.

By the use of my slide, the check-rein is prevented from working about the hook, and the horse prevented from moving his head from side to side or turning it round. And when the slide is moved close up to the hook, the check-rein is prevented from being disengaged from it.

Having thus described my invention, what I claim, is—

The check-rein slide, constructed as described, as a new article of manufacture.

W. B. POTTER.

Witnesses:
JOSEPH D. HATHAWAY, Jr.,
A. G. WILBOR.